J. FASIG.
Hay and Pruning Knife.
No. 102,524. Patented May 3, 1870.
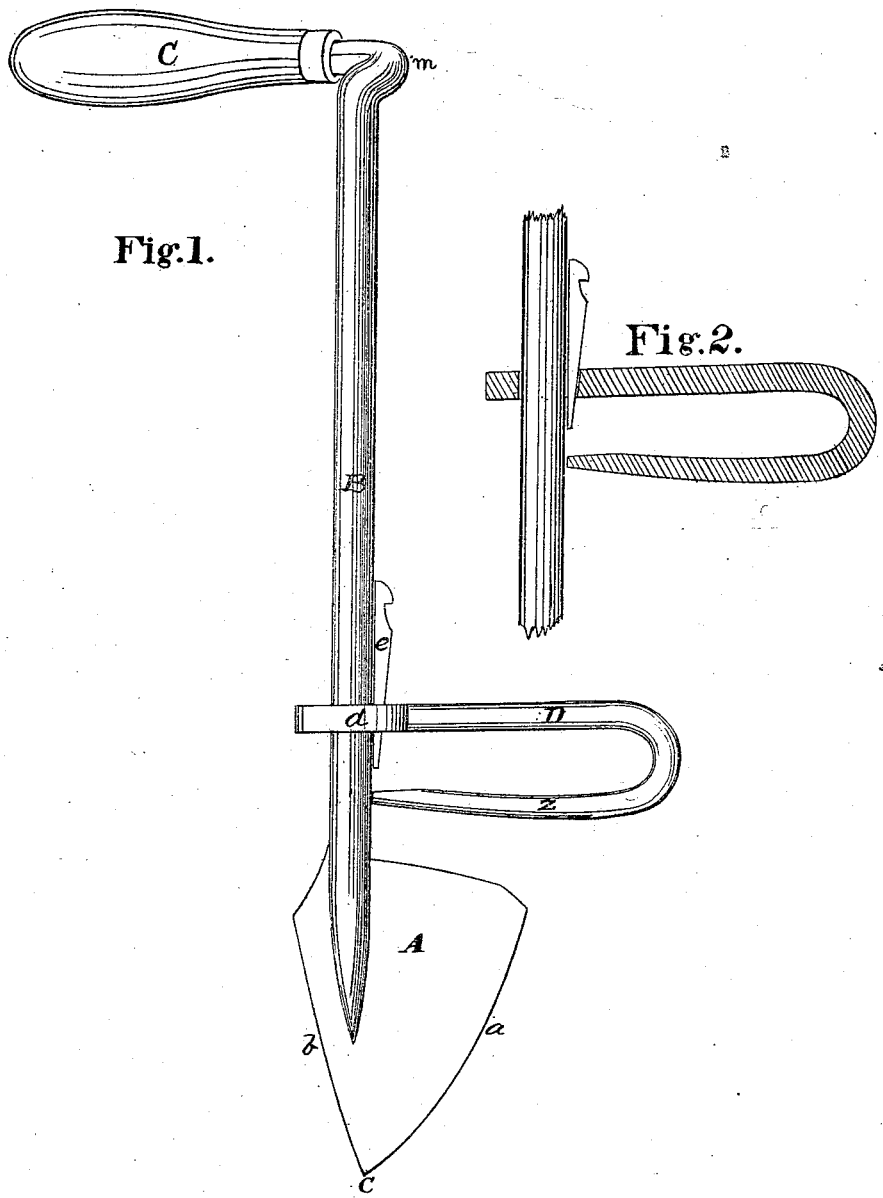

United States Patent Office.

JOHN FASIG, OF WEST SALEM, OHIO.

Letters Patent No. 102,524, dated May 3, 1870.

IMPROVEMENT IN COMBINED HAY AND PRUNING-KNIFE.

The Schedule referred to in these Letters Patent and making part of the same

To all whom it may concern:

Be it known that I, JOHN FASIG, of West Salem, in the county of Wayne and State of Ohio, have invented a new and valuable Improvement in Combined Hay and Pruning-Knives; and I do hereby declare that the following is a full, clear, and exact description of the construction and operation of the same, reference being had to the annexed drawings making a part of this specification, and to the letters and figures of reference marked thereon.

Figure 1 of the drawings is a front view of my invention.

Figure 2 is a sectional view of the same.

My invention relates to combined hay and pruning-knives, and consists mainly in the construction of an adjustable foot-step, adapted to be used upon either side of the knife, and capable of being placed high or low upon the shank thereof, according to the depth and solidity of the hay, if employed for chopping, or of being adjusted at the end of the shank in pruning.

The letter A of the drawings designates the blade of my knife, provided with the curved edges $a\ b$, inclining toward each other in such a manner as to bring the point $c$ of the blade in line with the shank.

B represents the shank, and

C, the upper handle, attached to the end thereof, and extending out at right angles thereto, but on the opposite of the same from the sharp curved edge $a$ of the blade.

D represents an adjustable foot-step, provided with an eye or collar, $d$, encircling the shank, and sliding thereon.

This foot-step is secured at any desired point upon the shank by means of the key $e$.

The foot-step extends outward from the shank in a horizontal direction, and then, bending downward, returns toward the shank, against which the free end rests, thus forming a brace, $z$.

In chopping, the height of the foot-step above the blade depends on the solidity and depth of the hay or straw to be cut, the right hand grasping the handle, while the left foot is placed in the foot-step.

When the knife is used for pruning, the step D is removed to the upper end of the shank, becoming a handle for the left hand.

In a similar manner, when the hay is packed very loosely, the step D is placed high upon the shank, and grasped by the left hand, the operator walking backward.

In order to bring the handle C nearer the body of the operator, the upper end of the shank is bent in this direction at $m$, before it is bent outward to form the handle.

What I claim as my invention, and desire to secure by Letters Patent, is—

The combined chopping and pruning-knife herein described, having elbow in the shank at $m$, and sliding adjustable foot-step D, arranged to be keyed at any height on the shank, as specified.

In testimony that I claim the above, I have hereunto subscribed my name in the presence of two witnesses.

JOHN FASIG.

Witnesses:
J. P. MORR,
GEO. MUSSER.